(12) United States Patent
Jacobson et al.

(10) Patent No.: US 6,905,721 B2
(45) Date of Patent: Jun. 14, 2005

(54) IMITATION CHEESE COMPOSITIONS FOR USE IN THE MANUFACTURE OF CHEESE LOAVES, SLICES AND THE LIKE, AND METHOD OF PRODUCING SUCH COMPOSITIONS

(75) Inventors: Michael R. Jacobson, Spring Valley, WI (US); Stephan M. Schalow, Leola, PA (US)

(73) Assignee: AFP advanced food products, llc, New Holland, PA (US)

( * ) Notice: Subject to any disclaimer, the term of this patent is extended or adjusted under 35 U.S.C. 154(b) by 423 days.

(21) Appl. No.: 10/183,859

(22) Filed: Jun. 25, 2002

(65) Prior Publication Data

US 2003/0017242 A1 Jan. 23, 2003

Related U.S. Application Data

(63) Continuation-in-part of application No. 09/888,720, filed on Jun. 25, 2001, now abandoned.

(51) Int. Cl.$^7$ .............................. A23C 3/00; A23C 19/00
(52) U.S. Cl. ...................... 426/334; 426/573; 426/574; 426/575; 426/576; 426/577; 426/580; 426/613
(58) Field of Search .......................... 426/334, 573–577, 426/580, 582, 601, 602, 613, 654

(56) References Cited

U.S. PATENT DOCUMENTS

| | | |
|---|---|---|
| 3,269,842 A | 8/1966 | Mayer et al. |
| 3,355,298 A | 11/1967 | Loter et al. |
| 3,359,116 A | 12/1967 | Little et al. |
| 3,391,002 A | 7/1968 | Little et al. |
| 3,492,129 A | 1/1970 | Carswell et al. |
| 3,645,757 A | 2/1972 | Gordon et al. |
| 3,929,892 A | 12/1975 | Hynes et al. |
| 3,955,010 A | 5/1976 | Chozianen et al. |
| 3,969,534 A | 7/1976 | Pavey et al. |
| 4,031,254 A | 6/1977 | Kasik et al. |
| 4,089,981 A | 5/1978 | Richardson |
| 4,143,175 A | 3/1979 | Whelan et al. |
| 4,199,608 A | 4/1980 | Gilmore et al. |
| 4,212,893 A | 7/1980 | Takahata |
| 4,235,934 A | 11/1980 | Egli et al. |
| 4,324,804 A | 4/1982 | Davis |
| 4,352,832 A | 10/1982 | Wood et al. |
| 4,387,109 A | 6/1983 | Kahn et al. |
| 4,390,560 A | 6/1983 | Koide et al. |
| 4,434,184 A | 2/1984 | Kharrazi |
| 4,478,859 A | 10/1984 | Fox, Jr. |
| 4,499,116 A | 2/1985 | Zwiercan et al. |
| 4,539,212 A | 9/1985 | Hunter |
| 4,568,555 A | 2/1986 | Spanier |
| 4,597,971 A | 7/1986 | Davis |
| 4,597,976 A | 7/1986 | Doster et al. |
| 4,608,265 A | 8/1986 | Zwiercan et al. |
| 4,623,552 A | 11/1986 | Rapp |
| 4,678,673 A | 7/1987 | Marshall et al. |
| 4,684,533 A | 8/1987 | Kratochvil |
| 4,693,901 A | 9/1987 | Hullah |
| 4,724,152 A | 2/1988 | Baker et al. |
| 4,734,291 A | 3/1988 | Raffensperger |
| 4,741,911 A | 5/1988 | McIntyre et al. |
| 4,748,026 A | 5/1988 | Keefer et al. |
| 4,749,584 A | 6/1988 | Wirchansky et al. |
| 4,756,919 A | 7/1988 | Cirigiano et al. |
| 4,762,726 A | 8/1988 | Soucie et al. |
| 4,789,553 A | 12/1988 | McIntyre et al. |
| 4,859,484 A | 8/1989 | Bielskis et al. |
| 4,873,094 A | 10/1989 | Pischke et al. |
| 4,937,091 A | 6/1990 | Zallie et al. |
| 4,968,512 A | 11/1990 | Kharrazi |
| 4,970,083 A | 11/1990 | Akahoshi et al. |
| 5,009,867 A | 4/1991 | Kratochvil |
| 5,013,573 A | 5/1991 | Boder et al. |

(Continued)

FOREIGN PATENT DOCUMENTS

| | | |
|---|---|---|
| CA | 1071920 | 2/1980 |
| CA | 1131982 | 9/1982 |
| GB | 1066176 | 4/1967 |
| GB | 2061693 | 5/1981 |
| GB | 2210246 | 7/1989 |
| GB | 2342272 | 12/2000 |
| JP | 58071880 | 4/1983 |
| WO | 9203934 | 3/1992 |
| WO | WO 92/03934 | 3/1992 |
| WO | 9208361 | 5/1992 |
| WO | 0070970 | 11/2000 |

OTHER PUBLICATIONS

Low–Acid Food Amendments Suggested for Processed Cheese Spreads, Food Chemical News, 1986.

Tanaka et al., Evaluation of Factors Involved in Antibotulinal Properties of Pastuerized Process Cheese Spreads, Journal of Food Protection, vol. 49, No. 7, 1986.

Brummel et al., Soluble Hydrocolloids Enable Fat Reduction in Process Cheese Spreads, Journal of Food Science, vol. 55, No. 5, 1990.

(Continued)

Primary Examiner—Leslie Wong
(74) Attorney, Agent, or Firm—Volpe and Koenig, P.C.

(57) ABSTRACT

An imitation cheese composition containing moisture, preferably in an amount that is at least 60% by weight, a hydrocolloid, a cheese-derived component in an amount less than about 15% by weight of the composition, cheese flavoring that is natural or artificial and an acidulents in an amount that causes a pH of the composition to be not greater than 4.6. The composition is sufficiently firm such that it can be at least one of sliced, cut, shredded or grated. Preferably, no more than 1% protein is present, and/or the acidulent is in a total titrateable amount of less than 1.5% by weight of the composition, resulting in an imitation cheese having a flavor, texture and consistency that was only previously attainable in a pasturized process cheese product.

33 Claims, No Drawings

U.S. PATENT DOCUMENTS

| | | | |
|---|---|---|---|
| 5,063,073 | A | 11/1991 | Kratochvil |
| 5,079,024 | A | 1/1992 | Crane |
| 5,094,873 | A | 3/1992 | Kerrigan et al. |
| 5,098,728 | A | 3/1992 | Singer et al. |
| 5,098,729 | A | 3/1992 | Engel |
| 5,108,773 | A | 4/1992 | Smith et al. |
| 5,171,603 | A | 12/1992 | Singer et al. |
| 5,180,604 | A | 1/1993 | Crane et al. |
| 5,196,215 | A | 3/1993 | Yokoyama et al. |
| 5,209,942 | A | 5/1993 | Bauer et al. |
| 5,286,510 | A | 2/1994 | Bauer et al. |
| 5,308,632 | A | 5/1994 | Howard et al. |
| 5,320,860 | A | 6/1994 | Duval et al. |
| 5,366,747 | A | 11/1994 | Buckholz et al. |
| 5,378,488 | A | 1/1995 | Dimler et al. |
| 5,439,697 | A | 8/1995 | Gonzalez-Sanz |
| 5,472,718 | A | 12/1995 | Ijsseldijk et al. |
| 5,670,197 | A | 9/1997 | Adrianson et al. |
| 5,807,601 | A | 9/1998 | Carpenter et al. |
| 5,879,729 | A | 3/1999 | King Solis et al. |
| 5,882,704 | A | 3/1999 | Yamaguchi et al. |
| 5,882,713 | A | 3/1999 | Eskins et al. |
| 5,895,685 | A | 4/1999 | Boder et al. |
| 5,932,267 | A | 8/1999 | Shima et al. |
| 5,935,634 | A | 8/1999 | Gamay et al. |
| 5,948,452 | A | 9/1999 | Monte |
| 6,013,303 | A | 1/2000 | Reddy et al. |
| 6,016,935 | A | 1/2000 | Huegerich et al. |
| 6,056,979 | A | 5/2000 | Benbadis et al. |
| 6,093,439 | A | 7/2000 | Whaley et al. |
| 6,113,976 | A | 9/2000 | Chiou et al. |
| 6,203,842 | B1 | 3/2001 | Reddy |
| 6,217,917 | B1 | 4/2001 | Bodor et al. |
| 6,228,419 | B1 | 5/2001 | Yuan et al. |
| 6,322,841 | B1 | 11/2001 | Jackson et al. |
| 6,358,551 | B1 | 3/2002 | Sadowsky, IV et al. |
| 6,596,331 | B1 | 7/2003 | Nobuyasu et al. |
| 2001/0018087 | A1 | 8/2001 | Coleman et al. |
| 2002/0071897 | A1 | 6/2002 | Hyde et al. |
| 2003/0198723 | A1 | 10/2003 | Kuroda et al. |

OTHER PUBLICATIONS

L. Leistner, Further Developments in the Utilization of Hurdle Technology for Food Preservation, Journal of Food Engineering 22, 1994.

Eckner et al., Contribution of Composition, Physiochemical Characteristics and Polyphosphates to the Microbial Safety of Pasteurized Cheese Spreads, Journal of Food Protection, vol. 57, No. 4, 1994.

Steeg et al., Growth of Proteolytic *Clostridium botulinum* in Process Cheese Products: I. Data Aquisition for Modeling the Influence of pH, Sodium Chloride, Emulsifying Salts, Fat Dry Basis, and Temperature, Journal of Food Protection, vol. 58, No. 10, 1995.

Campbell's® Tomato Bisque Soup (condensed).
Campbell's® Tomato Soup (condensed).
Campbell's® Mushroom Soup (condensed).
Campbell's® New England Clam Chowder (condensed).
Campbell's® New England Clam Chowder (chunky–style).
Campbell's® Cream of Potato (condensed).
Vlasic Foods® Open Pit® Original Bar–B–Que Sauce.
Kraft® Honey Bar–B–Que Sauce.
Hunt's® Snack Pack® Puddin' Pies™ (lemon meringue).
Jell–O® Fat–Free pudding snacks (chocoloate).
Hunt's® Snack Pack® Puddin' Pies™ (banana cream).
Hunt's® Snack Pack® Pudding (vanilla).
Hunt's® Snack Pack® Juicy Gels® (strawberry).
Lucky Leaf® Apple Sauce.
Kraft® Handi–Snacks® Pudding (tapioca).
Kraft® Handi–Snacks® Pudding (butterscotch).
Swiss Miss® Lemon Meringue Pudding (Stirred).
Jell–O® Gelatin Snacks (strawberry & orange).
Kraft® Roka® Blue Cheese Salad Dressing.
Kraft® Free® Blue Cheese–Flavored Salad Dressing.
Kraft® Free® Ranch Salad Dressing.
Hellmann's® Real Mayonnaise.
Wish Bone® Thousand Island Salad Dressing.
Kraft® Zesty Italian Salad Dressing.
Henri's® Fat–Free French–Style Dressing.
Campbell's® Fiesta Nacho Cheese Soup.
Campbell's® Cheddar Cheese Soup.
Campbell's® Tomato Soup.
Campbell's® Cream of Chicken.
Funacho® Aged Cheddar Cheese Sauce.
Frito Lay® Jalapeno Cheddar Cheese Dip.
Hunt's® Snack Pack® Juicy Gels® (strawberry orange).
Jell–O® Sugar Free Gelatin (rasberry and orange).

IMITATION CHEESE COMPOSITIONS FOR USE IN THE MANUFACTURE OF CHEESE LOAVES, SLICES AND THE LIKE, AND METHOD OF PRODUCING SUCH COMPOSITIONS

CROSS-REFERENCE TO RELATED APPLICATIONS

This application is a continuation-in-part of U.S. patent application Ser. No. 09/888,720, filed on Jun. 25, 2001, now abandoned, which application is incorporated herein by reference.

BACKGROUND OF THE INVENTION

The present invention relates to an acidified imitation cheese composition having a good shelf life, having good mouthfeel and taste, which can be manufactured into imitation hard, soft, or semi-soft cheeses and safely packaged using virtually any commercial packaging system, including hotfill, retort, or aseptic systems. The acidified imitation cheese composition of the invention can be used to make an assortment of imitation cheese products, including, but not limited to, imitation cheese loaves, logs and balls, imitation cheese sheets, imitation cheese wheels, imitation cheese slices, and imitation grated and shredded cheeses in a variety of flavors and colors.

Pasteurized process cheese products have been on the market for many years and are usually sold as shelf stable products. These products, such as the cheese slices used in the cheeseburgers of most American fast food restaurants, are favored by consumers and food service providers alike because of their versatility, shelf stability, and lower cost in comparison to natural cheese products. Pasteurized process cheese products typically have a relatively high pH (about 5.4 to 6.0) and a moisture content of approximately 50%. Because of their high pH, pasteurized process cheeses products fall into the category of "low acid food products" as defined in 21 C.F.R. § 114.3(d) (foods having a pH of greater than 4.6). It is well known in the industry that low acid products can easily become spoiled by microbial growth, thereby creating an unpleasant and potentially dangerous culinary experience for the consumer if handled or packaged improperly. To reduce the ever-present danger of microbial growth in low acid foods, in particular, contamination by *Clostridium botulinum*, the food industry has developed various methods of preservation applicable to low acid foods. Many low acid products are preserved by application of a high-temperature thermal treatment, such as sterilization, to a finished product, thereby destroying any viable bacterial contaminants. Commonly used food manufacturing procedures, such as aseptic and retort processing, incorporate these high heat treatments.

While effectively enhancing food safety, food sterilization through thermal processes has some inherent drawbacks. Both aseptic processing and retort processing require heating the finished product to high temperatures (around 121° C.–148° C. or 250° F.–300° F.) to accomplish sterilization. In addition to increased energy and equipment expenditures, high temperature processing can result in what is referred to as "burn on," linescale, or fouling of the product, where a commercially unacceptable burned or overcooked taste is imparted. Fouled product is unsaleable and is therefore discarded, resulting in a waste of materials and labor. Accordingly, the productivity and profitability of the manufacturing process is decreased.

Additionally, thermally sterilized food products must be retained by the manufacturer, by law, for an incubation period before releasing the product to the consumer. The finished product must be held in incubation for a minimum of approximately ten days before shipping, in order to verify that the sterilization process was adequate.

As an alternative to thermal sterilization, shelf stability can be achieved in some types of low acid products by control of the nature and amount of the various components which make up the substance of the food product. Preservatives may be added to the product, or bacterial growth may be controlled by limitations on the water activity ($a_w$) of the product's composition. However, these preservation methods have drawbacks which limit their practical applicability in large scale production and distribution situations. For example, foods containing large quantities of preservatives are disfavored by consumers, and enhanced shelf stability through control of water activity is feasible in only a narrow range of product types, because of the limitations placed on the composition of the product itself.

In the case of pasteurized process cheese products, bacterial stability is most often achieved though use of what is known in the art as "hurdle technology," a combined effect of carefully restricted levels of pH, moisture (water activity $a_w$), and salts (emulsifier phosphates and NaCl) in the process cheese composition, which is generally accepted in this field. Hurdle technology and its applications in the area of food preservation are well known and documented in the art, e.g., Tanaka, *J. Food Protect.*, vol. 49, no. 7, pp. 526–531 (July 1986), the contents of which are incorporated herein by reference.

The hurdle technology food preservation model predicts the level of bacterial stability of a given composition, depending on the specific levels of each the four parameters ("hurdles") of pH, moisture, emulsifier phosphates, and NaCl present in the composition. However, because the effects of variations or deviations from any of the prescribed parameters are unpredictably synergistic, the hurdle predictive models have created a paradigm of the specific component levels. Therefore, production-scale hurdle manufacture is limited to a narrow range of permutations of each of the parameters, and is limited to a relatively low level of moisture in the product (58% moisture by weight, or less), in order to ensure proper preservation of the resultant food product.

In contrast to low acid foods, including pasteurized process cheeses, "acidified" foods, as defined in 21 C.F.R. § 113.4(a), do not require application of any of the preservation techniques discussed above. Because such products are less susceptible to microbial spoilage by virtue of their acidic pH, they can be formulated for taste, texture, and cost advantage without regard to the effects of high heat sterilization or parameters of moisture or other "hurdles."

Significantly, an acidified cheese-type product could be formulated without regard to the moisture parameter required by the hurdle processing of pasteurized process cheese. Thus, the overall moisture content of the cheese-type product could be drastically increased, thereby conferring a significant economic advantage upon the manufacturer, who may replace the costly solids components with less expensive water or moisture components, while maintaining food safety. In addition, freedom from the hurdle processing parameters would allow manufacturers more flexibility to produce the lower salt and/or lower fat cheese-type products containing non-traditional emulsifiers, for which there is a growing market demand, without sacrificing consideration of the safety of the cheese-type product.

Consequently, because of the safety, regulatory, and manufacturing advantages of high acid or "acidified" food products, an imitation cheese composition which retains the flavor, texture and consistency properties of conventional pasteurized process cheese manufactured using hurdle technology would be particularly desirable. Such an acidified imitation cheese composition would have the benefit of being safer than conventional pasteurized process cheeses preserved by hurdle technology and/or sterilization because the acidic pH is sufficient to retard the growth of microbial pathogens. In addition, processing costs would be less for an acidified imitation cheese composition, as no sterilization would be required, nor would adherence to the hurdle predictive models, thereby reducing utility costs and increasing productivity by eliminating fouling and spoilage resulting from errors in manufacturing.

In the past, attempts have been made to develop an acidified cheese-type product which could occupy the same market niche as pasteurized process cheese. However, these products fail to adequately mimic the flavor, texture, and consistency of conventional pasteurized process cheeses. Significantly, unlike the savory, cheesy flavors characteristic of conventional pasteurized process cheese, the acidified cheese-type products of the prior art have been characterized by unpleasant, sharp, tart, sour or acidic flavors. As a result, these products have been commercially unacceptable without the addition of flavor-imparting substances, such as tomatoes, onions, peppers, and smoke flavors, to mask the unacceptable tastes.

U.S. Pat. No. 4,143,175 to Whelan et al. ("Whelan '175") discloses a cheese food product for use in a shelf stable pizza sauce with a moisture of up to 70%, a pH of less than 4.6 and between about 57% and 63% natural cheese. This product would be significantly more expensive to produce due to the high natural cheese content than the present invention.

U.S. Pat. No. 4,089,981 to Richardson ("Richardson '981") discloses a fibrous simulated food product, wherein the pH is less than 4.6 and is generated with a low volume of acid. However, Richardson '981 discloses an imitation cheese product with moisture of only about 56%, and protein of about 6% and between 10% and 85% cellulose fiber. Unlike the present invention, this type of product would likely not provide the consistency desired for cheese or the additional advantages of lower manufacturing costs based on the use of a high moisture content along with a lower protein content.

U.S. Pat. No. 4,031,254 to Kasik et al. ("Kasik '254") discloses a dry composition to which water is added to make cheese sauces and similar compositions. Even with the added water, the total moisture content is below 55% and the protein content is high. This does not offer the savings in manufacturing costs by using a higher moisture content and a lower protein content. The high protein content also may create a need for a higher amount of an acidulent in order to lower the pH, which would cause a sour acidic taste, similar to the known prior art.

U.S. Pat. No. 4,684,533 to Kratochvil ("Kratochvil '533") discloses an imitation cheese product having a protein content of at least 1.5%, but with a pH not below 4.6.

U.S. Pat. No. 5,009,867 to Kratochvil ("Kratochvil '867") discloses cheese-type products with high natural cheese contents.

U.S. Pat. No. 4,608,265 to Zwiercan et al. ("Zwiercan '265") and U.S. Pat. No. 4,937,091 to Zallie et al. ("Zallie '091") both disclose an imitation cheese, wherein up to 100% of the caseinate is replaced with starch. This results in a high starch, low protein imitation cheese. However, a high starch imitation cheese product of this type would likely have poor taste and textural characteristics. Additionally, in contrast to the present invention, it appears that this type of product relies on hurdle technology for shelf stability, based on its high solid, low moisture content.

Consequently, there remains a need in the food industry for an acidified composition useful in the manufacture of imitation cheese, including imitation cheese loaves, logs and balls, grated and shredded imitation cheeses, and imitation cheese wheels, which possesses a flavor, texture, and consistency as good as or superior to conventional pasteurized process cheese, yet, by virtue of its acidic pH, is resistant to microbial growth and less expensive to produce.

BRIEF SUMMARY OF THE INVENTION

The invention is an imitation cheese composition containing moisture, an acidulent in an amount that causes a pH of the composition to be not greater than 4.6, a hydrocolloid, a cheese-derived component in an amount less than about 15% by weight of the composition, and cheese flavoring, wherein the cheese flavoring is natural or artificial, the composition being sufficiently firm such that it can be at least one of sliced, cut, shredded or grated. In a preferred embodiment, the moisture is present in an amount that is at least 60% by weight of the composition.

In another aspect of the invention, the moisture is present in an amount that is greater than 70% by weight of the composition. In further aspects, the pH is about 2 to about 4.5, and/or protein is present in an amount less than 1% by weight of the composition.

The acidulent is preferably present in a total titrateable amount of less than 1.5%, and is more preferably present in a total titrateable amount of less than 0.5%. Also, the acidulent is preferably selected from the group consisting of cultured dextrose, glucono-δ-lactone, phosphoric acid and lactic acid.

The hydrocolloid is preferably present in an amount of at least 0.01% by weight of the composition. The hydrocolloid is preferably selected from the group consisting of agar, alginate, carrageenan, gelatin, guar gum, locust bean gum, pectin and xanthan gum.

In another aspect of the invention, a method for preparing an imitation cheese composition, is provided that includes the following steps:

preparing a composition comprising moisture in an amount greater than about 60% by weight of the composition, a hydrocolloid, a cheese-derived component in an amount less than about 15% by weight of the composition, and cheese flavoring, wherein the cheese flavoring is natural or artificial; and acidifying the composition to a pH of not greater than 4.6, wherein the resulting composition is sufficiently firm such that it can be at least one of sliced, cut, shredded or grated.

DETAILED DESCRIPTION OF THE PREFERRED EMBODIMENTS

It has been discovered that a shelf stable, high acid imitation cheese composition having a flavor, texture and consistency similar to that of the prior known pasturized cheeses can be made by combining moisture in an amount that is at least 60% by weight of the composition, a hydrocolloid, a cheese-derived component in an amount less than about 15% by weight of the composition, cheese flavoring that is either natural or artificial, and an acidulent in an amount such that a pH of the composition is not greater than 4.6, Preferably, the imitation cheese has a protein content of less than 1% by weight. The imitation cheese composition can be used to manufacture cheese loaves, slices and similar products that are sufficiently firm such that they can be sliced, cut, shredded and/or grated. Preferably, the acidulent is in a total titrateable amount of less than 1.5% by weight of the composition.

The imitation cheese composition has several important advantages over the prior art. Its pH of 4.6 or less (high acid) inhibits undesirable bacterial growth allowing for a long shelf life with no refrigeration necessary without the need for thermal sterilization or adherence to hurdle predictive models.

As a result of the low amount of protein in the imitation cheese composition, a relatively low volume of acid is needed to drop the pH to 4.6 or less. The low acid volume creates a better tasting imitation cheese without the unpleasant, sharp, tart, sour or acidic taste characterized by the prior known compositions containing a high volume of acid.

Since proteins are expensive components of imitation cheese compositions, the lower amount protein translates into reduced manufacturing costs. Manufacturing costs are further reduced by the high moisture content of the imitation cheese composition, made possible by the bacterial growth prevention effect of the composition's low pH.

The imitation cheese compositions of the invention possess a smooth, creamy, and dairy-like mouthfeel, with a chewiness and springiness of texture similar to that of pasteurized process cheese. If desired, the composition of the invention can be formulated so as to exhibit a melting behavior similar to that of natural cheese.

The term "microbial stability," as used herein, means that the product described does not support vegetative cell growth or spore germination to unacceptable levels.

The term "shelf stable," as used herein, means a product which can be distributed and merchandized at 21° C. (room temperature) with substantially little adverse affect on the microbial stability of the product.

The pH of the finished imitation cheese composition is not greater than 4.6, with a more preferred pH of about 2 to about 4.5, and a most preferred pH of about 3.2 to about 4.4, The pH is measured upon completion of the finished composition, either prior to final solidification of the composition, or after solidification, by any suitable means known in the art.

In this application, "imitation cheese" means imitation cheese and also cheese-type product. The imitation cheese composition of the invention is similar in texture and consistency to conventional pasteurized process cheeses. More precisely, the imitation cheese compositions of the invention have a textural character such that the fracturability of the compositions at 21° C. is from about 4.9 N to about 9.8 N, as determined by texture profile analysis conducted on a Texture Technologies® TA-XT21 analyzer, available from StableMicro Systems, Scarsdale, N.Y., USA. It is preferred that the compositions have a fracturability of about 5.9 N. to about 7.9 N, and most preferred that the compositions have a fracturability of about 6.9 N. The texture profile analysis to obtain the fracturability data of the compositions of the invention can be carried out routinely, as is known in the art, and as described in, e.g., Bourne, M. C., *Food Texture and Viscosity* Academic Press, New York (reprinted, 1994), the contents of which are incorporated herein by reference.

Moisture is present in the imitation cheese composition. In a preferred embodiment, the moisture is present in an amount of greater than about 60% by weight of the composition. It also is preferred that moisture be present in an amount of about 65% by weight to about 90% by weight, and it is more preferably in the range of about 70% to about 80% by weight of the composition. In a most preferred embodiment, moisture may be present in an amount of about 75% by weight of the composition. The moisture may be present as added moisture to the composition, or as a component of another ingredient (e.g., diluted acidulent, whey). The moisture also can be combined with whey, or consist entirely of whey.

Hydrocolloids for use in the imitation cheese composition of the present invention include any hydrocolloid or other food grade thickeners, any or all of which will hereinafter be referred to as "hydrocolloids." Hydrocolloids include a food grade hydrocolloid or mixture thereof known in the art capable of forming a gel-like, supportive matrix. Suitable hydrocolloids include, but are not limited to, food grade gums, such as guar gum, pectin, locust bean gum, xanthan gum, ghatti gum, and mixtures of such gums. Other useful hydrocolloids include gelatin, carboxymethylcellulose (CMC), tragacanth and plant-derived hydrocolloids, such as agar, alginate, carrageenan (kappa, iota, and lambda), and mixtures thereof. Preferred hydrocolloids include, for example, agar, pectin, xanthan gum, guar gum, locust bean gum, carboxymethylcellulose (CMC), and carrageenan (kappa, iota, and lambda) and mixtures of such. Cellulose or cellulose-derived hydrocolloids like CMC can be used as a hydrocolloid; however, if used in significant quantities, the resulting composition may possess an undesirable, bad-tasting, tough finished product.

In some embodiments, cellulose in an amount of up to about 10% of the composition may be included. The presence of cellulose increases the amount of dietary fiber in the composition, an attractive feature for many consumers.

In any case, the selected hydrocolloid(s) are present in the imitation cheese composition in an amount sufficient to provide to the composition a formable body which can be molded or pressed into traditional cheese shapes such as loaves, logs, balls, chunks, or slabs. A person of ordinary skill in the art will recognize that this amount will vary depending on the water management qualities and/or gelling capacity of the particular hydrocolloids used in a given composition. More precisely, the hydrocolloid(s) may be present in the composition in an amount of about 0.01% by weight to about 40% or more by weight of the composition, with a more preferred hydrocolloid content of not more than about 10% by weight of the composition, with a most preferred hydrocolloid content of not more than 6% by weight of the composition. In one embodiment, the composition includes a hydrocolloid in an amount of about 0.01% by weight to about 40% by weight of the total composition, but no more than 10% by weight of the total hydrocolloid component is a cellulose.

The acidified imitation cheese composition described herein contains an acidulent(s) present in an amount sufficient to maintain a pH of not greater than 4.6, and thereby increase microbial stability of the finished product. The acidified imitation cheese composition is microbially stable when it is simply pasteurized. Acidulents for use in the present invention may include any food grade organic or inorganic acids, or mixtures thereof. Examples of such acidulents are malic acid, citric acid, oxalic acid, tartaric acid, succinic acid, isocitric acid, finnaric acid, lactic acid, propionic acid, glucono-δ-lactone, acetic acid (vinegar), and mixtures thereof Particularly preferred acidulents include, for example, cultured dextrose, glucono-δ-lactone, phosphoric acid, and lactic acid.

The volume of the acidulent used in the composition will vary depending on the particular acidulent selected, the dilution factor of the acidulent, and the presence or absence of buffering components in the finished imitation cheese composition. The volume of acidulent should be sufficient to adjust the pH of the composition to not greater than 4.6, but preferably not to exceed a total titrateable acid (TTA) level of about 1.5% by weight of the composition.

It is desirable that the TTA of the finished composition should not exceed about 1.5% by weight, and is preferably less than 0.5% by weight. The TTA can be determined by the percent by weight of equivalents of glacial acetic acid present in the finished composition. Therefore, the present compositions may have not greater than about 1.5% equivalents of glacial acetic acid by weight in the finished composition. It is preferred that the compositions contain about 0.01% to about 0.4% of equivalents of glacial acetic acid by weight, and it is most preferred that the compositions contain about 0.1% by weight to about 0.3% by weight of equivalents of glacial acetic acid by weight of the composition.

The acidified imitation cheese composition preferably includes a cheese-derived component in an amount of no more than about 15% by weight of the composition. The term "cheese-derived component" as used herein includes any type of cheese, as defined in 21 C.F.R. § 133, the text of which is incorporated herein by reference, as well as food grade components obtained through the reduction, distillation, enzymatic (or fermentation) processing, or other chemical processing of such cheese or cheeses.

The imitation cheese composition may also include a cheese flavoring which imparts a characteristic savory, cheesy taste to the compositions. Suitable cheese flavorings include all those which are known in the art, such as enzyme-modified cheeses, enzyme modified lactile products, synthetic or artificial cheese flavorings, lipolyzed dairy flavors, dairy/cheese top notes and dairy/cheese push notes. Suitable enzyme modified cheese flavorings and lipolyzed dairy flavors are available from, for example, International Flavors and Fragrances, Menomonee Falls, Wis., USA. Natural and synthetic flavors suitable for use in the imitation cheese sauces of the present invention are available from, for example, Edlong, Elk Grove Village, Ill., USA. The type of cheese flavoring selected will vary depending on the specific natural cheese which the imitation cheese composition is intended to mimic. Suitable natural cheese flavors include, but are not limited to, any natural cheese flavors, such as cheddar, feta, American, mozzarella, Parmesan, asiago, Romano, Colby, Monterey jack, Brie, Camembert, provolone, Muenster, Gorgonzola, Swiss, Roquefort, chevre, Gruyere, blue, mimolette, and Gouda.

The cheese flavorings may be added to the composition in liquid, powder or paste form. A person of ordinary skill in the art will recognize that the amount of flavoring will vary, depending on the type of flavoring selected and the intensity of flavor desired in the finished composition.

The imitation cheese compositions of the invention may contain an added protein, other than the cheese-derived component, in an amount of less than 1% by weight of the composition. It is preferred that the protein be present in an amount of up to about 0.7% by weight, and more preferred that the protein be present in the amount of about 0.2% by weight to about 0.5% by weight of the composition. It is most preferred that there is minimal or no added protein present (other than any incidental protein which may be included in other components of the composition).

If protein, other than the cheese-derived component, is present in the composition, it is preferred that such protein has a low buffering capacity, so as not to require additional acidulent to maintain the pH at not greater than 4.6, Specifically, it is preferred that the protein or proteins selected for inclusion in the composition have a buffering capacity such that, in an 1.0% by weight solution of the protein or proteins in deionized water, no more than about 0.3 moles of acetic acid are required to move the pH of the solution one pH unit.

Additionally, depending on the texture or flavor desired, considerations of solubility (as indicated by the specific isoelectric points (pI) of a given protein or proteins) may guide the selection of the protein or proteins. It is preferred that the protein selected for use in the imitation cheese composition have an average isoelectric point (PI) of at least about 5, Such protein(s) include, for example, alkali or acid processed gelatin, whey proteins and mixtures thereof.

When solubility and/or buffering capacity is not a concern, preferred proteins may include soy protein, casein, egg proteins, hydrolyzed vegetable proteins, gelatin (alkali and acid processed), whey proteins, and mixtures thereof. In one embodiment, it is preferred that casein be avoided, particularly in amounts greater than 10% by weight, as it may produce an objectionable texture to the composition upon processing.

Additionally, while other proteins may be present in the composition, it is preferred, in one embodiment, that no more than about 1% of proteins having a pI of at least about 5 be included in the composition. In another embodiment, it is preferred that no more than about 1% of a protein(s) selected from whey protein, soy protein, casein, egg protein or hydrolyzed vegetable protein be included in the composition.

If desired, the composition may contain a fat or fats. Fats or oils for use in the present invention may be of animal origin, vegetable origin, or mixtures thereof. Such fats may be in liquid form or solid form at room temperature (21° C.). Fats for use in the present compositions include, but are not limited to, lard, butter, cream, butter oil, fully saturated vegetable oils, partially hydrogenated vegetable oils, non-hydrogenated vegetable oils, soybean oil, sunflower oil, olive oil, canola (rapeseed) oil, cottonseed oil, coconut oil, palm kernel oil, corn oil, butterfat, safflower oil, and mixtures thereof. Examples of preferred fats include partially hydrogenated vegetable oils, soybean oil, canola oil, sunflower oil, safflower oil, palm kernel oil, coconut oil, butterfat, or mixtures of such fats. In some cases, it is preferred that butterfat be used when preparing an imitation cheese composition, as it lends a pleasant, dairy-like note to the flavor of the sauce.

In general, the fat should be present in an amount sufficient to create the desired texture and consistency of the imitation cheese composition. More specifically, the fat or fats should be present in an amount of at least about 5% by weight of the composition, with a more preferred amount of up to about 50% by weight of the composition or, most preferred in an amount of about 10% to about 25% by weight of the composition. Fat(s) may also be avoided, in order to manufacture a fat free composition for health- or calorie-conscious consumers.

If the imitation cheese composition is prepared to contain a fat, the fat phase can exist in the finished product in emulsified form, e.g., in a dispersion facilitated by long chain alcohol fatty acid emulsifiers, fatty acid emulsifiers, proteinaceous emulsifiers, or carbohydrate emulsifiers, or in a suspension, e.g., dispersed and immobilized within the matrix of the thickener in the absence of such emulsifiers.

If it is desired that the fat phase of the imitation cheese composition be an emulsion, chemical emulsifiers may be included within the composition to facilitate emulsification. Chemical emulsifiers include, for example, glycerol esters, such as mono- and diglycerides and diacetyl tartaric acid esters of mono- and diglycerides (DATEM); acid pyrophosphate; sodium stearoyl lactylate; fatty acid esters, such as polysorbates; and phospholipids, such as lecithins; and mixtures thereof. It is preferred that such chemical emulsifiers are present in the composition in an amount of up to about 5% by weight of the composition.

Depending on the character desired in the end composition, a sweetener or sweeteners may be added to the acidified imitation cheese composition. Examples of suitable sweeteners include artificial and natural sweeteners such as saccharin, sucrose, fructose, glucose, corn syrup, maltose, honey, glycerin, fructose, aspartame, sucralose, high fructose corn syrup, crystallized fructose, acesulfame potassium, and mixtures thereof. The amount of sweetener used in the acidified compositions will vary depending on the desired taste and the perceived sweetness of the specific sweetener selected.

If desired, bulking agents may be added to the compositions to enhance the textural properties. Suitable bulking agents include, but are not limited to, maltodextrin, corn syrup solids, dextrose, lactose, whey solids, and mixtures thereof.

Food starches can be used in the manufacture of the imitation cheese compositions of the present invention to aid in water management. Suitable starches include, for example, modified and unmodified food starches, corn starch (dent or waxy), rice starch, tapioca, wheat starch, flour, potato starch, native food starches having cross-linked polysaccharide backbones, and mixtures thereof.

Any colorants known in the art, including all Certified colorants and natural colorants may be used in the acidified food compositions to impart a cheese color to the compositions. If the end product desired is to be a yellow/orange imitation cheese composition, the preferred colorants are Certified Yellow #5, Certified Yellow #6, annatto, carotenels, or oleoresin paprika. Additionally, it may be desirable to include titanium dioxide in the composition, to increase overall opacity.

If desired, preservatives may be included in the acidified food composition to prevent discoloration or decay, and to further ensure avoidance of microbial or fungal spoilage, or other degradation of the composition's components. Such preservatives include, for example, sodium benzoate, potassium sorbate, sorbic acid and EDTA.

In addition to cheese flavorings discussed above, additional flavorings or flavor-enhancing additives may be included in the imitation cheese composition, as long as such additions do not substantially alter the character of the composition. Such flavorings may include, for example, spices, such as black pepper, white pepper, salt, paprika, garlic powder, onion powder, oregano, thyme, chives, basil, curry, Worcestershire sauce, soy sauce, mustard flower, yeast extracts, cumin and mixtures thereof. Additionally, particulate components such as fruit or vegetable matter, meat, tofu, or nuts may be added.

Although preferred amounts of the various components of the acidified food compositions have been detailed herein, it will be apparent to one of skill in the art that the amounts of the components can be varied depending on the taste, texture, viscosity, color, and/or other organoleptic properties desired in the final composition.

The acidified imitation cheese compositions described herein may be manufactured by a variety of acceptable methods commonly known in the art which achieve dispersion, suspension, and/or hydration and homogenization of the selected product components prior to the undertaking of any processing and packaging operations. Examples of equipment currently used in the art for such purposes include high-shear mixers, two-stage high pressure dairy homogenizers, plate-type exchangers, ribbon blenders, scrape surface heat exchangers (SSHE), shear pumps and lay-down cookers. Because of the microbial stability of the acidified food composition, the formulation is amenable to almost all manufacturing and packaging processes known in the art, unlike low acid products, which are limited to only those manufacturing/production processes which involve high heat sterilization, control of water activity and pasteurized process cheese products, which require application of hurdle processing.

In general, according to a preferred procedure, the compositions of the present invention are manufactured by mixing, in hot water (about 68° C. or 155° F.), all of the selected fats, colorants, acidulents, emulsifiers and flavorings under high shear in a high shear mixer. This portion ("the homogenized base") is then homogenized, in two stages, at 2500/500 psi in a high-pressure dairy homogenizer. It is then cooled through a plate heat exchanger to about 10° C. (50° F.) and removed to a storage vessel. The selected thickeners and any desired particulate ingredients, such as vegetable matter, fruit or meats, are then suspended in cold water (about 10° C. or 50° F.) in the high shear mixer. The cold water suspension is then pumped into the cooled homogenized base.

It will be apparent to those of ordinary skill in the art that the above-described mixing process is not limited to a two-stage process. The final mixture could be created in a single stage mix, with or without homogenization, as is sometimes practiced in the food industry. The mixture formed by the addition of the cold water suspension to the homogenized base is then evaluated to ensure that it has the desired pH and TTA, before being further processed in such a way as to create a shelf stable product that requires no refrigeration.

If necessary or desired, the finished composition could be subjected to a thermal or other processes known in the art to eliminate the potential for fungal spoilage. Such processes include pasteurization, irradiation, high-pressure or high temperature sterilization, micro-wave processing and ohmic heating.

Packaging processes for the compositions described herein could include a high acid aseptic process technique, where the cooling of the product occurs in a process cooler, and the product is subsequently introduced into sterilized packages and sealed in a sterile zone; a hot fill process, where the product is heated to such a temperature as to kill yeasts, mold spores, and vegetative bacterial cells, the package is filled with a hot product, and the heat of the product kills unwanted pathogens in both the product and non-pre-sterilized packages; or a retort process, wherein the product is filled and sealed into packages at a relatively low temperature, after which it is heated in a pressurized retort vessel to a temperature sufficient to kill pathogenic microorganisms, and subsequently cooled. Any of these processes, when used in the manufacture of a composition of the present invention, will result in a commercially sterile finished product suitable for consumer consumption and which will remain shelf stable at room temperature.

EXAMPLE 1

An imitation cheese loaf was prepared in a single stage process as follows, using the following ingredients:

| No. | Ingredient | Percent (by weight) |
|---|---|---|
| 1 | Water | 70.61 |
| 2 | DATEM | 0.3 |
| 3 | Coconut oil | 20.0 |
| 4 | Enzyme modified cheddar cheese flavoring | 1.1 |
| 5 | Salt | 1.2 |
| 6 | Kappa carrageenan | 0.2 |
| 7 | Cellulose gel | 1.0 |
| 8 | Titanium dioxide | 0.1 |
| 9 | Annatto powder (15%) | 0.04 |
| 10 | Maltodextrin | 1.5 |
| 11 | Cultured dextrose | 0.1 |
| 12 | Glucono-δ-lactone | 0.36 |
| 13 | Agar | 2.5 |
| 14 | Pectin | 1.0 |

The entire amount of water was heated to 82° C. (180° F.) and placed in a high shear mixer. DATEM (ingredient no. 2) was added to the water and mixed under high agitation until blended. The coconut oil was added, and the entire mixture was sheared so as to melt the oil into the water-DATEM mixture. Ingredient nos. 5, 10, 9, 8, and 4 were added and the entire mixture was agitated until blended. Under high shear, the hydrocolloids (ingredient nos. 6, 7, 13, and 14) were added. Finally, the acidulents (ingredient nos. 11 and 12 were added and blended throughout.

The entire mixture was held at 68° C. (155° F.) until the hydrocolloids became fully hydrated and no longer lumpy. The entire mixture was pumped into a high pressure homogenizer, and homogenization was carried out at 2000 psi in a single stage. The product was then packed into rectangular loaf-shaped containers, and cooled to form a gelled cheese like mass having a solid, sliceable consistency.

The pH of the resulting product was about 4.3, moisture was present in an amount of 70% by weight of the composition, and the composition possessed textural characteristics such that the fracturability of the composition was 7.1 N.

In summary, the imitation cheese composition has several important advantages over the prior art. Its high acidity inhibits undesirable bacterial growth and makes it shelf stable without the need for thermal sterilization or adherence to hurdle predictive models. The imitation cheese composition tastes better than other imitation cheese compositions due to this small amount of acid and can provide a taste that was only previously achievable with a pasturized process cheese product. The imitation cheese composition also is relatively inexpensive to manufacture because of the high moisture and low protein content.

It will be appreciated to those of ordinary skill in the art that changes could be made to the embodiments described above without departing form the broad inventive concepts thereof. It is understood, therefore, that this invention is not limited to the particular embodiments disclosed, but is intended to cover modifications within the spirit and scope of the present invention as defined by the appended claims.

What is claimed is:

1. An imitation cheese composition comprising:
    a) moisture in an amount that is at least 60% by weight of the composition,
    b) an acidulent in an amount that causes a pH of the composition to be not greater than 4.6,
    c) a hydrocolloid,
    d) a cheese-derived component in an amount less than about 15% by weight of the composition, and
    e) cheese flavoring, wherein the cheese flavoring is natural or artificial,
    the composition being sufficiently firm such that it can be at least one of sliced, cut, shredded or grated.

2. The composition according to claim 1, wherein the moisture is present in an amount that is greater than 70% by weight of the composition.

3. The composition according to claim 1, wherein the acidulent is in a total titrateable amount of less than 1.5% by weight of the composition such that the pH of the composition is not greater than 4.6.

4. The composition according to claim 1, wherein the acidulent is in a total titrateable amount of less than 1% by weight of the composition such that the pH of the composition is not greater than 4.6.

5. The composition according to claim 1, wherein the acidulent is in a total titrateable amount of less than 0.5% by weight of the composition such that the pH of the composition is not greater than 4.6.

6. The composition according to claim 1, wherein the acidulent is present in an amount not more than about 1.5% equivalents of glacial acetic acid by weight of the composition.

7. The composition according to claim 1, wherein the acidulent is selected from the group consisting of cultured dextrose, glucono-δ-lactone, phosphoric acid and lactic acid.

8. The composition according to claim 1, wherein the pH is about 2 to about 4.5.

9. The composition according to claim 1, wherein the hydrocolloid is present in an amount of at least 0.01% by weight of the composition.

10. The composition according to claim 1, wherein the hydrocolloid is selected from the group consisting of agar, alginate, carrageenan, gelatin, guar gum, locust bean gum, pectin and xanthan gum.

11. The composition according to claim 1, further comprising a protein in an amount less than 1% by weight of the composition.

12. The composition according to claim 11, wherein the protein is present in an amount of about 0.2% by weight to about 0.5% by weight of the composition.

13. The composition according to claim 11, wherein the protein is selected from the group consisting of gelatin, whey protein, soy protein, egg protein and hydrolyzed vegetable protein.

14. The composition according to claim 11, wherein the protein has an average isoelectric point (pI) of at least about 5.

15. The composition of claim 1, wherein the cheese-derived component is present in an amount of at least 0.1% by weight of the composition.

16. The composition of claim 1, further comprising no more than about 1% by weight of the composition of a protein, other than the cheese-derived ingredient, having an average isoelectric point (pI) of at least about 5.

17. The composition of claim 16, wherein the protein is one which has a buffering capacity such that a 1.0% solution of the protein in deionized water requires no more than about 0.3 moles of acetic acid to change the pH of the solution by one pH unit.

18. The composition according to claim 1, further comprising a fat, other than the cheese-derived component.

19. The composition according to claim 18, wherein the fat is present as a fat phase dispersed and mobilized within the hydrocolloid.

20. The composition according to claim 18, wherein the fat is selected from the group consisting of soybean oil, canola oil, sunflower oil, safflower oil, palm kernel oil, coconut oil, olive oil and butterfat.

21. The composition of claim 18, wherein the fat is present in an amount of at least about 5% by weight of the composition.

22. The composition of claim 1, wherein the cheese flavoring is selected from the group consisting of enzyme modified cheese, enzyme modified lactile products, and synthetic flavors.

23. The composition according to claim 1, wherein the composition has a fracturability of about 9.8 N at 21° C.

24. The composition of claim 1, further comprising a chemical emulsifier in an amount up to about 5% by weight of the composition.

25. The composition of claim 24, wherein the chemical emulsifier is selected from the group consisting of monoglycerides, diglycerides, polysorbates, sodium stearoyl lactylate, and diacetyl tartaric acid esters of mono- and di-glycerides (DATEM).

26. An imitation cheese composition comprising:
    a) moisture in an amount that is at least 70% by weight of the composition,
    b) an acidulent in an amount that causes a pH of the composition to be not greater than 4.6,
    c) a hydrocolloid, and
    d) cheese flavoring, wherein the cheese flavoring is natural or artificial,
    the composition being sufficiently firm such that it can be at least one of sliced, cut, shredded or grated.

27. An imitation cheese composition comprising:
    a) moisture,
    b) a hydrocolloid in an amount of about 0.01% to about 40% by weight of the composition,
    c) an acidulent,
    d) a cheese-derived component in an amount of no more than about 15% by weight of the composition, and
    e) cheese flavoring,
    wherein the composition has a fracturability of about 4.9 N to about 9.8 N at 21° C. and a pH of not greater than 4.6.

28. An imitation cheese composition comprising:
    a) moisture in an amount that is at least 60% by weight of the composition,
    b) an acidulent in a total titrateable amount of less than 1.5% by weight of the composition such that a pH of the composition is not greater than 4.6,
    c) a hydrocolloid, and
    d) cheese flavoring, wherein the cheese flavoring is natural or artificial,
    the composition being sufficiently firm such that it can be at least one of sliced, cut, shredded or grated.

29. The composition according to claim 28, further comprising a cheese-derived component.

30. An imitation cheese composition comprising:
    a) moisture,
    b) an acidulent in an amount that causes a pH of the composition to be not greater than 4.6,
    c) a hydrocolloid,
    d) a cheese-derived component in an amount less than about 15% by weight of the composition,
    e) cheese flavoring, wherein the cheese flavoring is natural or artificial, and
    f) cellulose in an amount less than about 10%,
    the composition being sufficiently firm such that it can be at least one of sliced, cut, shredded or grated.

31. An imitation cheese composition comprising:
    a) a combination of moisture and whey in an amount that is at least 60% by weight of the composition,
    b) an acidulent in an amount that causes a pH of the composition to be not greater than 4.6,
    c) a hydrocolloid,
    d) a cheese-derived component in an amount less than about 15% by weight of the composition, and
    e) cheese flavoring, wherein the cheese flavoring is natural or artificial,
    the composition being sufficiently firm such that it can be at least one of sliced, cut, shredded or grated.

32. A method for preparing an imitation cheese composition, said method comprising:
    preparing a composition comprising moisture in an amount greater than about 60% by weight of the composition, a hydrocolloid, a cheese-derived component in an amount less than about 15% by weight of the composition, and cheese flavoring, wherein the cheese flavoring is natural or artificial; and
    acidifying the composition to a pH of not greater than 4.6,
    wherein the resulting composition is sufficiently firm such that it can be at least one of sliced, cut, shredded or grated.

33. A method for increasing the microbial stability of an imitation cheese, the method comprising the steps of:
    a) preparing a composition comprising moisture in an amount greater than about 60% by weight of the composition, a hydrocolloid in an amount of about 0.01% by weight to about 40% by weight of the composition, a cheese-derived component in an amount of no more than about 15% by weight of the composition, a protein in an amount of no more than about 1% by weight of the composition, and a cheese flavoring; and
    b) acidifying the composition to a pH of not greater than 4.6, such that the imitation cheese has increased microbial stability,
    wherein the resulting composition is sufficiently firm such that it can be at least one of slice, cut shredded or grated.

* * * * *